United States Patent
Talisayon et al.

(10) Patent No.: US 11,977,890 B2
(45) Date of Patent: May 7, 2024

(54) STATEFUL MICROCODE BRANCHING

(71) Applicant: ADVANCED MICRO DEVICES, INC., Santa Clara, CA (US)

(72) Inventors: Magiting M. Talisayon, Boxborough, MA (US); Luca Schiano, Boxborough, MA (US); Neil N. Marketkar, Boxborough, MA (US); Yueh-Chuan Tzeng, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 12 days.

(21) Appl. No.: 17/566,040

(22) Filed: Dec. 30, 2021

(65) Prior Publication Data
US 2023/0229447 A1    Jul. 20, 2023

(51) Int. Cl.
*G06F 9/30* (2018.01)
*G06F 9/38* (2018.01)

(52) U.S. Cl.
CPC ...... *G06F 9/30149* (2013.01); *G06F 9/30058* (2013.01); *G06F 9/30065* (2013.01); *G06F 9/3836* (2013.01); *G06F 9/3861* (2013.01)

(58) Field of Classification Search
CPC ............. G06F 9/30149; G06F 9/30058; G06F 9/30065; G06F 9/3836; G06F 9/3861
See application file for complete search history.

(56) References Cited

U.S. PATENT DOCUMENTS

| | | | | |
|---|---|---|---|---|
| 5,023,828 A * | 6/1991 | Grundmann | ............... | G06F 9/26 712/E9.023 |
| 5,319,756 A * | 6/1994 | Ohno | .................. | G06F 9/30094 712/E9.079 |
| 5,347,638 A * | 9/1994 | Desai | ........................ | G06F 9/24 712/E9.007 |
| 5,586,278 A * | 12/1996 | Papworth | .............. | G06F 9/3863 712/217 |
| 5,721,855 A * | 2/1998 | Hinton | .................. | G06F 9/3885 712/E9.055 |
| 5,796,973 A * | 8/1998 | Witt | ...................... | G06F 9/3857 712/215 |
| 6,336,178 B1 * | 1/2002 | Favor | ...................... | G06F 9/382 712/E9.046 |
| 6,493,821 B1 * | 12/2002 | D'Sa | ...................... | G06F 9/3863 714/15 |
| 2008/0216073 A1 * | 9/2008 | Yates | .................... | G06F 9/3861 718/100 |
| 2011/0055523 A1 * | 3/2011 | Kaplan | ................. | G06F 9/3822 712/214 |
| 2020/0192676 A1 * | 6/2020 | Pearce | .................. | G06F 9/5038 |

OTHER PUBLICATIONS

Koppe, P. et al. Reverse Engineering x86 Processor Microcode. USENIX Security Symposium 2017, pp. 1163-1180 [online], [ retrieved on Mar. 23, 2023]. Retrieved from the Internet <URL: https://www.usenix.org/system/files/conference/usenixsecurity17/sec17-koppe.pdf>.*

* cited by examiner

*Primary Examiner* — Shawn Doman (57) ABSTRACT

Stateful microbranch instructions, including: generating, based on an instruction, a first one or more microinstructions including a stateful microbranch instruction, wherein the stateful microbranch instruction includes: an address of a next instruction after the instruction; a branch target address; one or more microcode attributes; and executing the first one or more microinstructions.

20 Claims, 5 Drawing Sheets

FIG. 1

| Stateful Microbranch 114 | | | | | |
|---|---|---|---|---|---|
| Op Code 202 | Branch Operands 204 | Branch Target Address 206 | Next Instruction Address 208 | Microcode Attribute(s) 210 | Value(s) 212 |

STATEFUL MICROCODE BRANCHING

BACKGROUND

In order to execute some machine-language instructions, a sequence of microinstructions are generated and inserted into an execution pipeline. Where these microinstructions include branch microinstructions, branch prediction is used to determine which microinstructions to execute. In the event of a branch microinstruction misprediction, an execution pipeline must be flushed.

DETAILED DESCRIPTION

As mentioned above, in order to execute some machine-language instructions, a sequence of microinstructions is generated and inserted into an execution pipeline. Where these microinstructions include branch microinstructions, branch prediction is used to determine which microinstructions to execute. In the event of a branch microinstruction misprediction, an execution pipeline must be flushed. In order to fetch microinstructions from the appropriate address, and in order for the instruction fetch unit to resume fetching machine-language instructions, various attributes must be restored, including a next machine-language instruction address and various attributes of the microinstructions, such as their address size, operand size, and instruction size. As this data is not preserved across cycles, it requires significant time and computational resources in order to determine these values and resume execution in the event of a pipeline flush.

To that end, the present specification sets forth various implementations for stateful microcode branching. In some implementations, a method for stateful microcode branching includes: generating, based on an instruction, a first one or more microinstructions including a stateful microbranch instruction, wherein the stateful microbranch instruction includes: an address of a next instruction after the instruction, a branch target address, and one or more microcode attributes. The method also includes executing the first one or more microinstructions.

In some implementations, the method further includes performing, in response to a misprediction of the stateful microbranch instruction, a pipeline flush and storing, in an instruction pointer, the address of the next instruction indicated in the stateful microbranch instruction. In some implementations, the method further includes generating, based on the one or more microcode attributes, a second one or more microinstructions from a taken branch for the stateful microbranch instruction and executing the second one or more microinstructions. In some implementations, the stateful microbranch instruction further includes one or more values based on one or more operands of the instruction. In some implementations, the one or more values include a loop count. In some implementations, the second one or more microinstructions are further generated based on the one or more values. In some implementations, the one or more microcode attributes include a microcode operand size. In some implementations, the one or more microcode attributes include a microcode address size.

The present specification also describes various implementations of a processor for stateful microcode branching. Such an apparatus includes a front end generating, based on an instruction, a first one or more microinstructions including a stateful microbranch instruction. The stateful microbranch instruction includes an address of a next instruction after the instruction, a branch target address and one or more microcode attributes. Such an apparatus also includes an execution unit executing the first one or more microinstructions.

In some implementations, the execution unit performs, in response to a misprediction of the stateful microbranch instruction, a pipeline flush and stores, in an instruction pointer, the address of the next instruction indicated in the stateful microbranch instruction. In some implementations, the front end generates, based on the one or more microcode attributes, a second one or more microinstructions from a taken branch for the stateful microbranch instruction and provides the second one or more microinstructions to the execution unit. In some implementations, the stateful microbranch instruction further includes one or more values based on one or more operands of the instruction. In some implementations, the one or more values include a loop count. In some implementations, the second one or more microinstructions are further generated based on the one or more values. In some implementations, the one or more microcode attributes include a microcode instruction size. In some implementations, the one or more microcode attributes include a microcode address size.

Also described in this specification are various implementations of an apparatus for stateful microcode branching. Such an apparatus includes: computer memory; a processor operatively coupled to the computer memory, the processor including a front end generating, based on an instruction, a first one or more microinstructions including a stateful microbranch instruction. The stateful microbranch instruction includes an address of a next instruction after the instruction, a branch target address, and one or more microcode attributes. The processor also includes an execution unit executing the first one or more microinstructions.

In some implementations, the execution unit performs, in response to a misprediction of the stateful microbranch instruction, a pipeline flush and stores, in an instruction pointer, the address of the next instruction indicated in the stateful microbranch instruction. In some implementations, the front end generates, based on the one or more microcode attributes, a second one or more microinstructions from a taken branch for the stateful microbranch instruction and provides the second one or more microinstructions to the execution unit. In some implementations, the stateful microbranch instruction further includes one or more values based on one or more operands of the instruction.

The following disclosure provides many different implementations, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows include implementations in which the first and second features are formed in direct contact, and also include implementations in which additional features be formed between the first and second features, such that the first and second features are not in direct contact. Further, spatially relative terms, such as "beneath," "below," "lower," "above," "upper," "back," "front," "top," "bottom," and the like, are used herein for ease of description to describe one element or feature's relationship to another element(s) or feature(s) as illustrated in the figures. Similarly, terms such as "front surface" and "back surface" or "top surface" and "back surface" are used herein to more easily identify various components, and identify that those components are, for example, on opposing sides of another component. The spatially relative terms are intended to encompass different orientations of the device in use or operation in addition to the orientation depicted in the figures.

Figure 1:
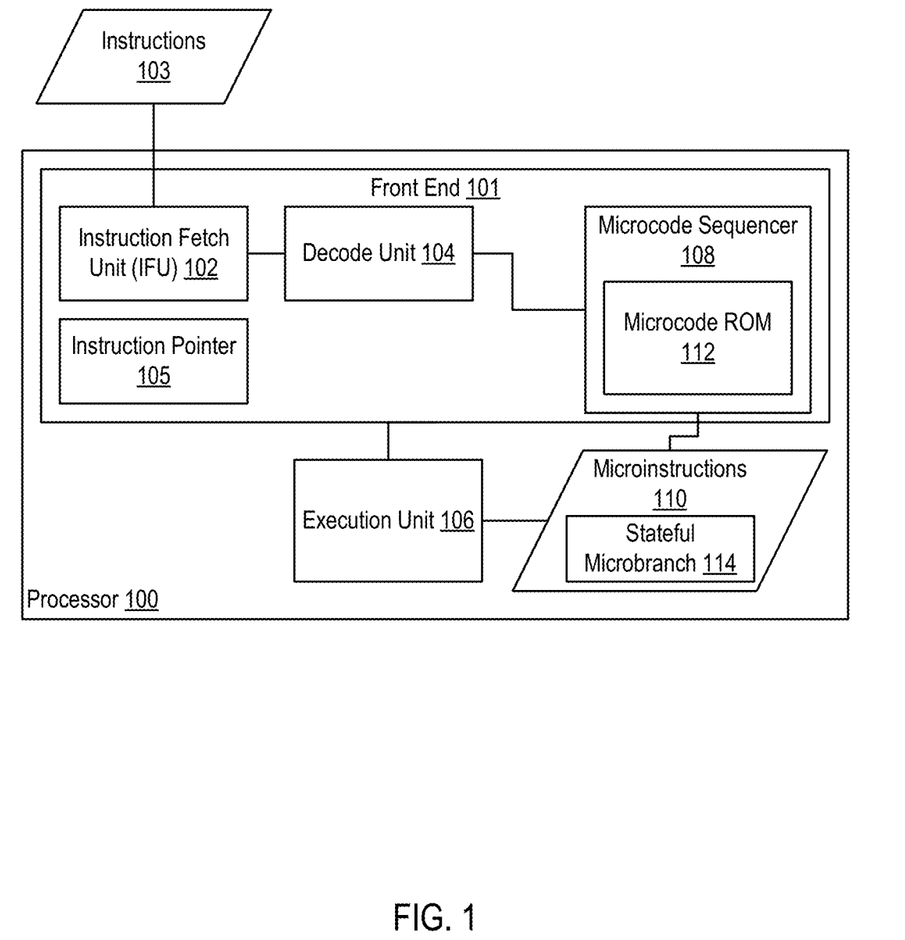
FIG. 1 is a block diagram of an example processor for stateful microcode branching according to some implementations.

FIG. 1 is a block diagram of a non-limiting example processor 100. In addition to the description set forth with respect to FIG. 1, the functionality of the processor 100 is described in further detail in the methods described in FIGS. 4-5. The example processor 100 can be implemented in a variety of computing devices, including mobile devices, personal computers, peripheral hardware components, gaming devices, set-top boxes, and the like. The processor 100 includes a front end 101. The front end 101 is a logical grouping of components that handles the management of instructions 103 for execution, including fetching, decoding, microcode conversion, and the like. The front end 101 includes an instruction fetch unit (IFU) 102. The IFU 102 loads instructions 103 (e.g., machine-language instructions 103) from memory. The memory from which the instructions are loaded includes, for example, volatile memory such as Random Access Memory (RAM), non-volatile memory such as disk-based storage, cache memory, or combinations thereof. The IFU 102 loads one or more instructions 103 from an address identified in an instruction pointer 105. The instruction pointer 105 (e.g., a program counter) is a dedicated register that identifies where in program sequence the processor 100 is located.

The IFU 102 then provides the loaded instructions 103 to a decode unit 104 for decoding. The decode unit 104 decodes received instructions 103 for execution by an execution unit 106. The execution unit 106 includes logic, circuitry, and the like that causes a provided instruction 103 to be executed. The execution of the instruction 103 causes a particular result to be generated in a computer implementing the processor 100. One or more of the instructions 103 includes a microcoded instruction 103. In contrast to non-microcoded instructions 103 that, after decoding, are provided as a single instruction to the execution unit 106, microcoded instructions 103 are converted by the front end 101 into multiple microinstructions 110 for execution instead of the microcoded machine-language instruction 103. A microinstruction 110 is a single instruction that activates the necessary circuits (e.g., in the execution unit 106) that are required to perform a single operation. Thus, multiple microinstructions 110 are executed in order to perform a single microcoded machine-language instruction 103.

In order to generate the microinstructions 110 required for a given instruction 103, the decode unit 104 accesses a microcode sequencer 108. The microcode sequencer 108 generates a sequence of microinstructions 110 for a given instruction 103 and inserts them into the execution pipeline for execution by the execution unit 106. To do so, the microcode sequencer 108 retrieves microcode from a Microcode Read-Only Memory (ROM) 112. The Microcode ROM 112 is an addressed area of memory storing microcode from which microinstructions 110 are generated. Although the Microcode ROM 112 is described as read-only memory, one skilled in the art will appreciate that, in other implementations, the microcode sequencer 108 will retrieve microcode from other data sources, including Static Random Access Memory (SRAM), programmable logic arrays, and the like.

The microcode stored in the microcode ROM 112 is stored as a template, or as incomplete microinstructions 110. In order to generate a microinstruction 110, the microcode sequencer will combine the stored microcode with encoded operands. In some implementations, the operands of a given microinstruction 110 are encoded based on the operands of an instruction 103 provide to the microcode sequencer 108 (e.g., by the decode unit 104). For example, particular values, identified registers, memory addresses, and the like that serve as operands are provided to the microcode sequencer 108 for encoding in a microinstruction 110. To generate a sequence of microinstructions 110, in some implementations, the microcode sequencer 108 identifies an address in the microcode ROM 112 to begin fetching microcode for conversion into microinstructions 110 (e.g., using a lookup table or similar structure). In order to access the microcode ROM 112 and generate microinstructions 110, the microcode sequencer 108 uses microcode attributes provided by the decode unit 104. Such microcode attributes describe particular encoding parameters for microinstructions, including the operand size, the address size, the instruction size, and the like.

In order to implement some instructions 103, a sequence of microinstructions 110 will require a branch microinstruction 110. A branch microinstruction 110 is similar to a branch instruction 103 in that the branch microinstruction 110 will cause an executed sequence of microinstructions 110 to jump to a defined address in the Microcode ROM 112. The microcode sequencer 108 will then continue to generate microinstructions 110 from the indicated address if the branch condition is satisfied. Also similar to machine-language branch instructions 103, the microcode sequencer 108 implements branch prediction functionality to predict whether a particular branch in a branch microinstruction 110 is taken.

In the event of a misprediction (e.g., on execution of the stateful microbranch 114 instruction, the taken path does not match the predicted path), a pipeline flush is performed. Any speculatively fetched and generated microinstructions (e.g., from the mispredicted branch path) must be flushed such that microinstructions 110 are fetched and generated from the taken branch path. Moreover, the execution pipeline must be flushed such that the instruction fetch unit 102 begins fetching instructions 103 from the address after the address for the microcoded instruction 103 whose microinstructions 110 experienced the misprediction.

In existing solutions, certain stateful parameters are not persisted, requiring additional steps and operations in the event of such a pipeline flush. For example, as the microinstructions 110 are generated and fed by the microcode sequencer 108 into the execution pipeline, the instruction fetch unit 102 has continued to increment the instruction pointer 105 and fetch instructions 103 without preserving the address of the instruction 103 after the microcoded instruction 103 whose microinstructions 110 experienced the misprediction. Moreover, the microcode sequencer 108 did not maintain the microcode attributes (e.g., address size, operand size, and the like) provided by the decode unit 104 that are required to begin fetching from the microcode ROM 112 at the taken branch.

Figure 2:
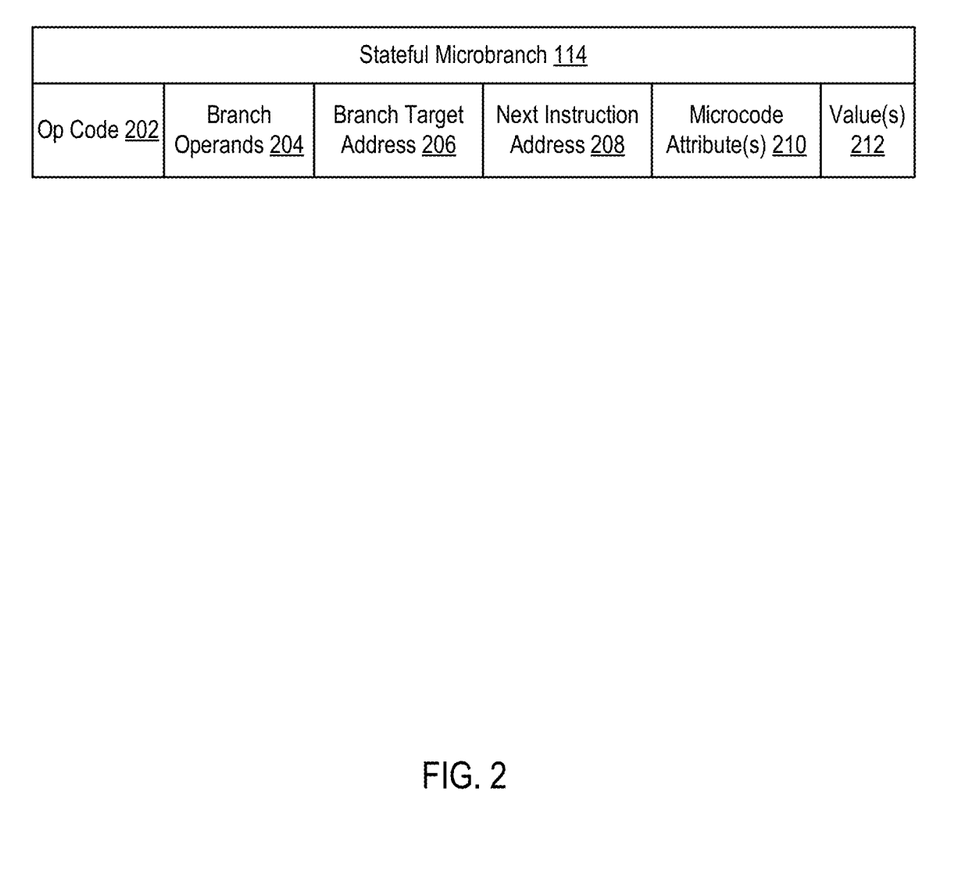
FIG. 2 is a diagram of an example stateful microbranch instruction for stateful microcode branching according to some implementations.

To address these concerns, a stateful microbranch 114 microinstruction (hereinafter referred to as a "stateful microbranch 114") is implemented. A stateful microbranch 114 is a branch microinstruction 110 that includes state-based operands in addition to those typically found in a branch microinstruction 110. As shown in FIG. 2 and as found in existing branch microinstructions 110, in some implementations, a stateful microbranch 114 includes an opcode 202 indicating a particular type of branch condition. Also as found in existing branch microinstructions 110, in some implementations, a stateful microbranch 114 includes one or more branch operands 204. The branch operands 204 are operands in a comparison performed on execution of the stateful microbranch 114 to determine if a particular branch is taken. For example, where the stateful microbranch 114 is a branch on equal branch, the branch operands 204 will identify particular registers, addresses, and the like to be compared to determine if they are equal. As another example, where the stateful microbranch 114 is a branch on equal to zero, the branch operands 204 will identify particular registers, addresses, and the like to be accessed to determine if their stored value is equal to zero.

Further similar to existing branch microinstructions 110, the stateful microbranch 114 includes a branch target address 206. The branch target address 206 is an address in microcode ROM 112 that, if the conditions of the stateful microbranch 114 are satisfied, microcode will be loaded and microinstructions 110 generated from that identified address.

In contrast to existing solutions for branch microinstructions 110, in some implementations, the stateful microbranch 114 also includes a next instruction address 208. The next instruction address 208 is an address of an instruction 103 occurring sequentially after the microcoded instruction 103 used to generate the stateful microbranch 114. In further contrast to existing solutions, in some implementations, the stateful microbranch 114 includes one or more microcode attributes 210. Such microcode attributes 210 include, for example, a microcode address size, a microcode operand size, and the like.

In some implementations, the stateful microbranch 114 also includes one or more additional values 212. In some implementations, these values correspond to or are based on one or more operands or parameters of the instruction 103 from which the microinstructions 110 including the stateful microbranch 114 are generated. In some implementations, the one or more values 212 include a loop count indicating a number of times a particular operation is to be performed. As an example, assume a copy instruction 103 that includes, as operands, three registers indicating source address, a destination address, and a number of bytes to be copied. The number of bytes to be copied serves as a loop count as a single byte copy is performed a number of times equal to the number of bytes to be copied. In some implementations, the value 212 will then indicate the number of bytes to be copied (e.g., the loop count).

In some implementations, the next instruction address 208, microcode attributes 210, and values 212 are provided to the microcode sequencer 108 by the decode unit 104 or another front end 101 component. Thus, when the microcode sequencer 108 generates the stateful microbranch 114, these parameters from the decode unit 104 are encoded into the stateful microbranch 114.

In the event of a misprediction for the stateful microbranch 114, the data necessary to restore the state of the execution pipeline are stored in the stateful microbranch 114, reducing the time and amount of operations required to perform the pipeline flush. As an example, in response to a misprediction, the execution unit 106 stores, from the stateful microbranch 114 into the instruction pointer 105, the next instruction address 208. The instruction fetch unit 102 is then able to fetch instructions from this next instruction address 208. The execution unit 106 also provides, to the microcode sequencer 108, the microcode attributes 210 and, where the taken branch was for the branch target address 206, the branch target address 206 as indicated in the stateful microbranch 114. Thus, the microcode sequencer 108 can generate microinstructions 110 based on the microcode attributes 210 and from the appropriate microcode address.

Consider an example with a string copy instruction 103 "strcpy $a, $b, $n" that copies a number of bytes from a source memory address to a destination memory address. The instruction 103 includes operands $a, a register storing the source memory address, $b, a register storing the destination memory address, and $n, a register storing a number of sequential bytes to be copied. The IFU 102 fetches the instruction 103 and provides it to the decode unit 104. The decode unit 104 accesses the microcode sequencer 108 to generate the multiple microinstructions 110 required for the instruction 103. Such microinstructions 110 include, for example, microinstructions 110 to load memory addresses from registers, microinstructions 110 to copy a byte from the source memory address to the destination memory address, microinstructions 110 to increment a counter for a number of bytes copied, and a stateful microbranch 114 that determines whether the counter is equal to the value stored in $n. Where the counter is not equal to $n, a jump is performed that causes the copying of bytes to repeat through further microinstructions 110.

The decode unit 104 provides the next instruction address 208 and microcode attributes 210 to the microcode sequencer 108 for encoding in the generated stateful microbranch 114. The microcode sequencer 108 encodes, into the stateful microbranch 114, the opcode 202, branch operands 204, and branch target address 206. In some implementations, the microcode sequencer 108 also encodes, as a value 212, the value stored in the register $n.

In this example, assume that the microcode sequencer 108 predicts that a stateful microbranch 114 after an Mth iteration will result in a branch not taken, effectively ending the iterative loop and completing the microinstruction 110 subroutine for the instruction 103. Accordingly, the microcode sequencer 108 generates microinstructions 110 to perform M iterations (e.g., copying M bytes). However, on executing the stateful microbranch 114, the result is that a branch will be taken due to a value N in $n being greater than M. Accordingly, the stateful microbranch 114 was mispredicted and a pipeline flush must be initiated. Accordingly, as part of the pipeline flush, the execution unit 106 stores the next instruction address 208 encoded into the stateful microbranch 114 into the instruction pointer 105. Thus, after the pipeline flush, the IFU 102 will resume fetching instructions from the next instruction address 208. The execution unit 106 also provides, to the microcode sequencer 108, the branch target address 206 encoded in the stateful microbranch 114 such that microinstructions 110 are generated from the microcode ROM 112 address of the branch target address 206. Moreover, the execution unit 106 provides, to the microcode sequencer 108, the microcode attributes 210 encoded in the stateful microbranch 114 such that microcode is loaded from the microcode ROM 112 and microinstructions 110 generated using these microcode attributes 210.

In some implementations, the processor 100 of FIG. 1 is implemented in a computer 300. In addition to at least one processor 100, the computer 300 of FIG. 3 includes random access memory (RAM) 304 which is connected through a high speed memory bus 306 and bus adapter 308 to processor 100 and to other components of the computer 300. Stored in RAM 304 is an operating system 310. The operating system 310 in the example of FIG. 3 is shown in RAM 304, but many components of such software typically are stored in non-volatile memory also, such as, for example, on data storage 312, such as a disk drive.

Figure 3:
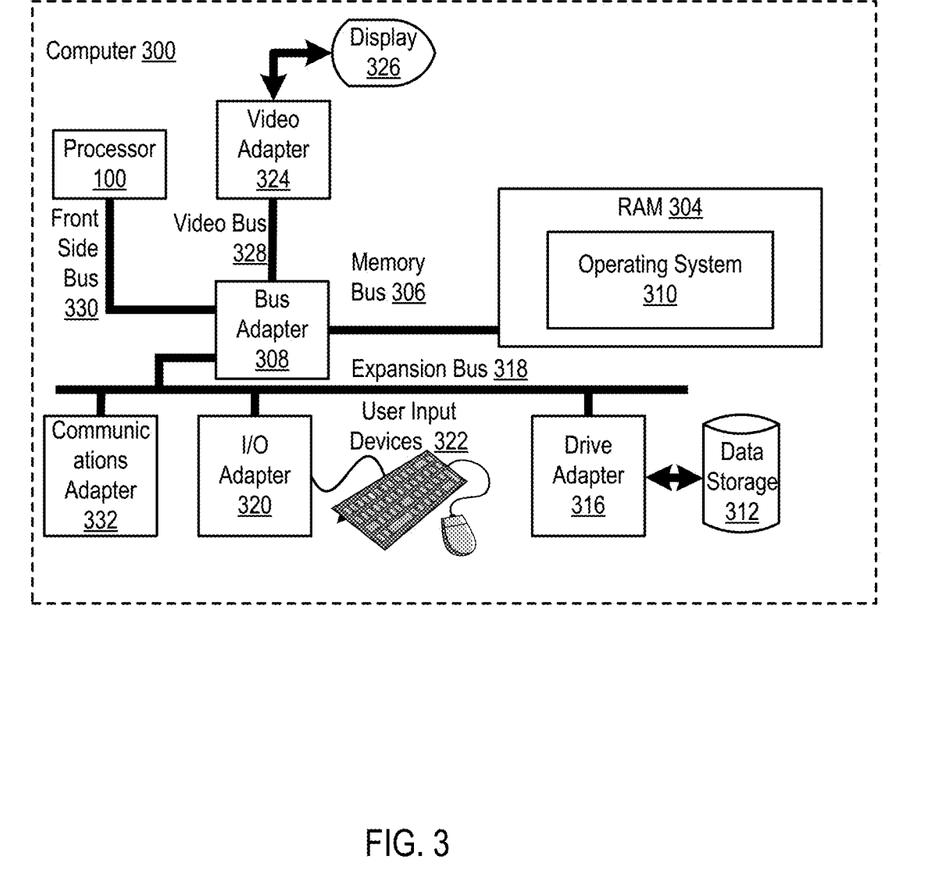
FIG. 3 is a block diagram of an example computer for stateful microcode branching according to some implementations.

The computer 300 of FIG. 3 includes disk drive adapter 316 coupled through expansion bus 318 and bus adapter 308 to processor 100 and other components of the computer 300. Disk drive adapter 316 connects non-volatile data storage to the computer 300 in the form of data storage 312. Such disk drive adapters include Integrated Drive Electronics ('IDE') adapters, Small Computer System Interface ('SCSI') adapters, and others as will occur to those of skill in the art. In some implementations, non-volatile computer memory is implemented as an optical disk drive, electrically erasable programmable read-only memory (so-called 'EEPROM' or 'Flash' memory), RAM drives, and so on, as will occur to those of skill in the art.

The example computer 300 of FIG. 3 includes one or more input/output ('I/O') adapters 320. I/O adapters implement user-oriented input/output through, for example, software drivers and computer hardware for controlling output to display devices such as computer display screens, as well as user input from user input devices 322 such as keyboards and mice. The example computer 300 of FIG. 3 includes a video adapter 324, which is an example of an I/O adapter specially designed for graphic output to a display device 326 such as a display screen or computer monitor. Video adapter 324 is connected to processor 100 through a high speed video bus 328, bus adapter 308, and the front side bus 330, which is also a high speed bus.

The exemplary computer 300 of FIG. 3 includes a communications adapter 332 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters 332 implement the hardware level of data communications through which one computer sends data communications to another computer, directly or through a data communications network. Such communication adapters 332 include modems for wired dial-up communications, Ethernet (IEEE 802.3) adapters for wired data communications, and 802.11 adapters for wireless data communications.

Figure 4:
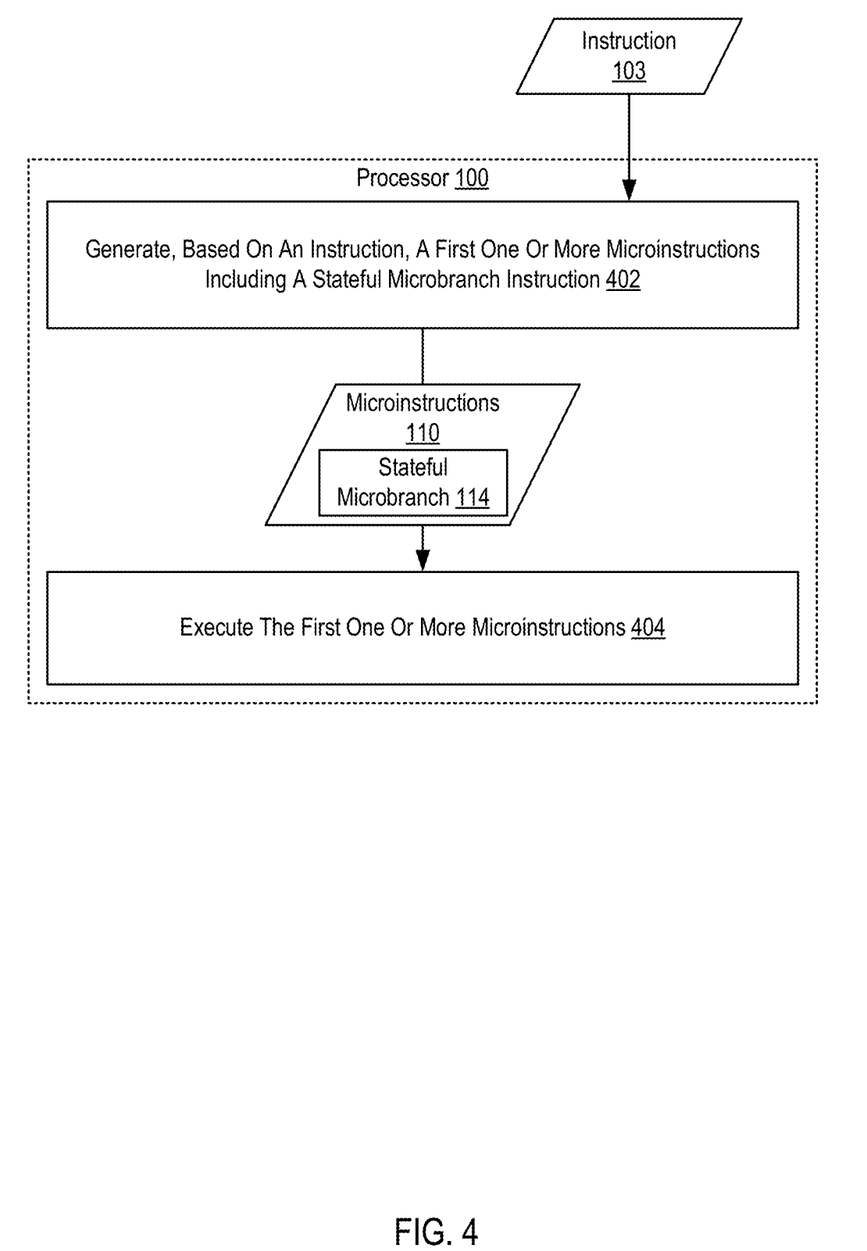
FIG. 4 is a flowchart of an example method for stateful microcode branching according to some implementations.
Figure 5:
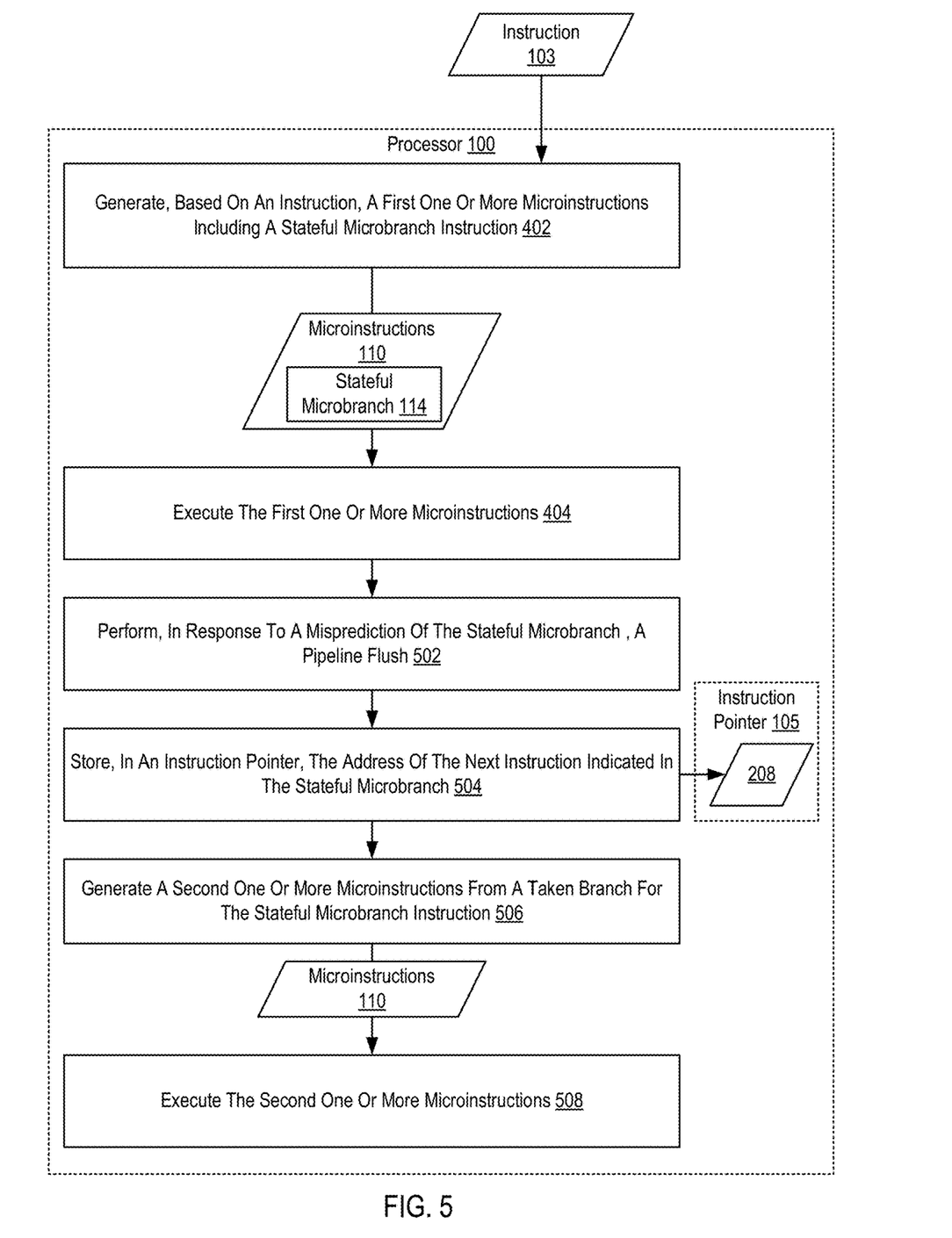
FIG. 5 is a flowchart of another example method for stateful microcode branching according to some implementations.

The approaches described above for stateful microcode branching described above with respect to FIG. 1 are also described as methods in the flowcharts of FIGS. 4-5. Accordingly, for further explanation, FIG. 4 sets forth a flow chart illustrating an example method for stateful microcode branching according to some implementations of the present disclosure. The method of FIG. 4 is implemented, for example, in a processor 100. The method of FIG. 4 includes generating 402, based on an instruction 103, a first one or more microinstructions 110 including a stateful microbranch 114 instruction. The instruction 103 includes a machine-language instruction 103 fetched (e.g., from memory) by an IFU 102. The instruction 103 is then provided to a decode unit 104 for decoding.

The instruction 103 is a microcoded instruction 103 in that the instruction is converted into multiple microinstructions 110 for execution instead of a single instruction 103. To generate the first one or more microinstructions 110, a microcode sequencer 108 generates a sequence of microinstructions 110 for a given instruction 103 and inserts them into the execution pipeline for execution by the execution unit 106. For example, in some implementations, the microcode sequencer 108 retrieves microcode from a Microcode Read-Only Memory (ROM) 112. The Microcode ROM 112 is an addressed area of memory storing microcode from which microinstructions 110 are generated. Although the Microcode ROM 112 is described as read-only memory, one skilled in the art will appreciate that, in other implementations, the microcode sequencer 108 will retrieve microcode from other data sources, including Static Random Access Memory (SRAM), programmable logic arrays, and the like.

The microcode stored in the microcode ROM 112 is stored as a template, or as incomplete microinstructions 110. In order to generate a microinstruction 110, the microcode sequencer will combine the stored microcode with encoded operands. In some implementations, the operands of a given microinstruction 110 are encoded based on the operands of an instruction 103 provide to the microcode sequencer 108 (e.g., by the decode unit 104). For example, particular values, identified registers, memory addresses, and the like that serve as operands are provided to the microcode sequencer 108 for encoding in a microinstruction 110. To generate a sequence of microinstructions 110, in some implementations, the microcode sequencer 108 identifies an address in the microcode ROM 112 to begin fetching microcode for conversion into microinstructions 110 (e.g., using a lookup table or similar structure). In order to access the microcode ROM 112 and generate microinstructions 110, the microcode sequencer 108 uses microcode attributes encoding parameters for microinstructions 110, including the operand size, the address size, the instruction size, and the like.

As is set forth above, the first one or more microinstructions 110 includes a stateful microbranch 114 instruction. A stateful microbranch 114 is a branch microinstruction 110 that includes state-based operands in addition to those typically found in a branch microinstruction 110. As shown in FIG. 2 and as found in existing branch microinstructions 110, in some implementations, a stateful microbranch 114 includes an opcode 202 indicating a particular type of branch condition. Also as found in existing branch microinstructions 110, in some implementations, a stateful microbranch 114 includes one or more branch operands 204. The branch operands 204 are operands in a comparison performed on execution of the stateful microbranch 114 to determine if a particular branch is taken. For example, where the stateful microbranch 114 is a branch on equal branch, the branch operands 204 will identify particular registers, addresses, and the like to be compared to determine if they are equal. As another example, where the stateful microbranch 114 is a branch on equal to zero, the branch operands 204 will identify particular registers, addresses, and the like to be accessed to determine if their stored value is equal to zero.

Further similar to existing branch microinstructions 110, the stateful microbranch 114 includes a branch target address 206. The branch target address 206 is an address in microcode ROM 112 that, if the conditions of the stateful microbranch 114 are satisfied, microcode will be loaded and microinstructions 110 generated from that identified address.

In contrast to existing solutions for branch microinstructions 110, in some implementations, the stateful microbranch 114 also includes a next instruction address 208. The next instruction address 208 is an address of an instruction 103 occurring sequentially after the microcoded instruction 103 used to generate the stateful microbranch 114. In further contrast to existing solutions, in some implementations, the stateful microbranch 114 includes one or more microcode attributes 210. Such microcode attributes 210 include, for example, a microcode address size, a microcode operand size, and the like.

In some implementations, the stateful microbranch 114 also includes one or more additional values 212. In some implementations, these values correspond to or are based on one or more operands or parameters of the instruction 103 from which the microinstructions 110 including the stateful microbranch 114 are generated. In some implementations, the one or more values 212 include a loop count indicating a number of times a particular operation is to be performed. As an example, assume a copy instruction 103 that includes, as operands, three registers indicating source address, a destination address, and a number of bytes to be copied. The number of bytes to be copied serves as a loop count as a single byte copy is performed a number of times equal to the number of bytes to be copied. In some implementations, the value 212 will then indicate the number of bytes to be copied (e.g., the loop count).

In some implementations, the next instruction address 208, microcode attributes 210, and values 212 are provided to the microcode sequencer 108 by the decode unit 104 or another front end 101 component. Thus, when the microcode sequencer 108 generates the stateful microbranch 114, these parameters from the decode unit 104 are encoded into the stateful microbranch 114.

The method of FIG. 4 also includes executing 404 the first one or more microinstructions 110. Executing 404 the first one or more microinstructions 110 includes providing the first one or more microinstructions 110 (e.g., by the microcode sequencer 108) to an execution unit 106. In some implementations, the microcode sequencer 108 provides the first one or more microinstructions 110 to an intermediary component such as a queue (e.g., a decode queue, a microinstruction 110 queue). The microinstructions 110 are then loaded from the queue into the execution unit 106 for execution.

For further explanation, FIG. 5 sets forth a flow chart illustrating another example method for stateful microcode branching according to implementations of the present disclosure. The method of FIG. 5 is similar to that of FIG. 4, differing in that the method of FIG. 5 includes performing 502 in response to a misprediction of the stateful microbranch 114, a pipeline flush. In some implementations, a microcode sequencer 108 implements branch prediction for stateful microbranches 114 to predict whether a branch will be taken or not taken. The microcode sequencer 108 will speculatively generate microinstructions 110 for execution based on the predicted branch. Where the stateful microbranch 114 is executed and the branch prediction was incorrect, a pipeline flush is performed.

Performing 502 the pipeline flush includes removing any speculatively generated microinstructions 110 for the mispredicted branch from an execution pipeline or queue. Performing 502 the pipeline flush also includes rolling back any fetched instructions 103, speculatively fetched or executed instructions 103, and the like from the processor 100 instruction pipeline.

The method of FIG. 5 also includes storing 504, in an instruction pointer 105, the address of the next instruction 103 indicated in the stateful microbranch 114. As is described above, the stateful microbranch 114 includes an address for an instruction 103 occurring after the instruction 103 for which the stateful microbranch 114 was generated (e.g., a next instruction address 208). After the pipeline flush, the IFU 102 should begin fetching instructions 103 from this next instruction address 208. Accordingly, the next instruction address 208 is stored into the instruction pointer 105 (e.g., by the execution unit 106). The IFU 102 then accesses the instruction pointer 105, now storing the next instruction address 208, to begin fetching instructions 103.

The method of FIG. 5 also includes generating 506 a second one or more microinstructions 110 from a taken branch for the stateful microbranch 114 instruction. On execution of the stateful microbranch 114, the microcode sequencer 108 is directed to a taken branch for the stateful microbranch 114. For example, where the misprediction was for a branch not taken, the microcode sequencer 108 is directed to a microcode ROM 112 address matching the branch target address 206. Accordingly, the execution unit 106 provides the branch target address 206 to the microcode sequencer 108. In some implementations, the execution unit 106 also provides, to the microcode sequencer 108, one or more microcode attributes 210 encoded in the stateful microbranch 114, such as an address size, operand size, and the like. The microcode sequencer 108 then generates the second one or more microinstructions 110 using the provided microcode attributes 210 from the taken branch. The method of FIG. 5 also includes executing 508 the second one or more microinstructions 110 (e.g., by providing the second one or more microinstructions 110 to an execution unit 106).

In view of the explanations set forth above, readers will recognize that the benefits of stateful microcode branching include, among others, improved performance of a computing system by reducing the computational overhead and time required to recover from a misprediction of a microcode branch.

Exemplary implementations of the present disclosure are described largely in the context of a fully functional computer system for stateful microcode branching. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary implementations described in this specification are oriented to software installed and executing on computer hardware, nevertheless, alternative implementations implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some implementations, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. A method for stateful microcode branching, the method comprising:
generating, based on an instruction in a sequence of instructions, a first one or more microinstructions comprising a stateful microbranch instruction, wherein the stateful microbranch instruction comprises:
an address of a next instruction in the sequence of instructions after the instruction;
a branch target address; and
one or more microcode attributes; and
executing the first one or more microinstructions.

2. The method of claim 1, further comprising:
performing, in response to a misprediction of the stateful microbranch instruction, a pipeline flush; and
storing, in an instruction pointer, the address of the next instruction indicated in the stateful microbranch instruction.

3. The method of claim 2, further comprising:
generating, based on the one or more microcode attributes, a second one or more microinstructions from a taken branch for the stateful microbranch instruction; and
executing the second one or more microinstructions.

4. The method of claim 3, wherein the stateful microbranch instruction further comprises one or more values based on one or more operands of the instruction.

5. The method of claim 4, wherein the one or more values comprise a loop count.

6. The method of claim 5, wherein the second one or more microinstructions are further generated based on the one or more values.

7. The method of claim 1, wherein the one or more microcode attributes comprise a microcode operand size.

8. The method of claim 1, wherein the one or more microcode attributes comprise a microcode address size.

9. A processor for stateful microcode branching, comprising:
a front end configured to generate, based on an instruction in a sequence of instructions, a first one or more microinstructions comprising a stateful microbranch instruction, wherein the stateful microbranch instruction comprises:
an address of a next instruction in the sequence of instructions after the instruction;
a branch target address; and
one or more microcode attributes; and
an execution unit configured to execute the first one or more microinstructions.

10. The processor of claim 9, wherein the execution unit is further configured to:
perform, in response to a misprediction of the stateful microbranch instruction, a pipeline flush; and
store, in an instruction pointer, the address of the next instruction indicated in the stateful microbranch instruction.

11. The processor of claim 10, wherein the front end is further configured to:
generate, based on the one or more microcode attributes, a second one or more microinstructions from a taken branch for the stateful microbranch instruction; and
provide the second one or more microinstructions to the execution unit.

12. The processor of claim 11, wherein the stateful microbranch instruction further comprises one or more values based on one or more operands of the instruction.

13. The processor of claim 12, wherein the one or more values comprise a loop count.

14. The processor of claim 13, wherein the second one or more microinstructions are further generated based on the one or more values.

15. The processor of claim 10, wherein the one or more microcode attributes comprise a microcode operand size.

16. The processor of claim 10, wherein the one or more microcode attributes comprise a microcode address size.

17. An apparatus for stateful microcode branching, comprising:
computer memory;
a processor operatively coupled to the computer memory, the processor comprising a front end configured to generate, based on an instruction in a sequence of instructions, a first one or more microinstructions comprising a stateful microbranch instruction, wherein the stateful microbranch instruction comprises:
an address of a next instruction in the sequence of instructions after the instruction;
a branch target address; and
one or more microcode attributes; and
an execution unit configured to execute the first one or more microinstructions.

18. The apparatus of claim 17, wherein the execution unit is further configured to:
perform, in response to a misprediction of the stateful microbranch instruction, a pipeline flush; and
store, in an instruction pointer, the address of the next instruction indicated in the stateful microbranch instruction.

19. The apparatus of claim 18, wherein the front end is further configured to:
generate, in response to the misprediction and based on the one or more microcode attributes, a second one or more microinstructions from a taken branch for the stateful microbranch instruction, wherein the one or more microcode attributes were flushed from a microcode sequencer in response to the misprediction; and
provide the second one or more microinstructions to the execution unit.

20. The apparatus of claim 19, wherein the stateful microbranch instruction further comprises one or more values based on one or more operands of the instruction.

* * * * *